US008430756B2

(12) United States Patent
McComb et al.

(10) Patent No.: US 8,430,756 B2
(45) Date of Patent: Apr. 30, 2013

(54) GAMING MACHINE CABINET WITH EDGE LIGHTING

(75) Inventors: Ryan D. McComb, Grand Rapids, MI (US); Brian R. Soules, Newaygo, MI (US)

(73) Assignee: Patent Rights Protection Group, LLC, Las Vegas, NV (US)

( * ) Notice: Subject to any disclaimer, the term of this patent is extended or adjusted under 35 U.S.C. 154(b) by 396 days.

(21) Appl. No.: 12/777,523

(22) Filed: May 11, 2010

(65) Prior Publication Data

US 2011/0281657 A1 Nov. 17, 2011

(51) Int. Cl.
*A63F 13/08* (2006.01)

(52) U.S. Cl.
USPC .................. 463/46; 463/30; 463/31; 463/32; 463/33; 312/223.5

(58) Field of Classification Search ............. 463/16–20, 463/30–33; 312/223.5
See application file for complete search history.

(56) References Cited

U.S. PATENT DOCUMENTS

| | | | |
|---|---|---|---|
| D275,117 | S | 8/1984 | Heywood |
| 4,918,579 | A | 4/1990 | Bennett |
| D307,771 | S | 5/1990 | Cesaroni et al. |
| 5,108,099 | A | 4/1992 | Smyth |
| 5,113,990 | A | 5/1992 | Gabrius et al. |
| D333,164 | S | 2/1993 | Kraft et al. |
| D373,809 | S | 9/1996 | Hirato |
| D380,014 | S | 6/1997 | Yang |
| D381,697 | S | 7/1997 | Brettschneider |
| D381,700 | S | 7/1997 | Brettschneider |
| 5,826,882 | A | 10/1998 | Ward |
| D413,635 | S | 9/1999 | Taylor |
| 6,068,101 | A | 5/2000 | Dickenson et al. |
| D428,062 | S | 7/2000 | Hayashi |
| 6,135,884 | A | 10/2000 | Hedrick et al. |
| 6,183,109 | B1 | 2/2001 | Nelson et al. |
| 6,186,645 | B1 | 2/2001 | Camarota |
| D439,931 | S | 4/2001 | Yamaguchi |
| D446,252 | S | 8/2001 | Yamaguchi |
| 6,283,608 | B1 | 9/2001 | Straat |
| 6,334,612 | B1 | 1/2002 | Wurz et al. |
| 6,592,238 | B2 | 7/2003 | Cleaver et al. |
| D489,417 | S | 5/2004 | Munoz et al. |
| 6,776,504 | B2 | 8/2004 | Sloan et al. |
| D495,754 | S | 9/2004 | Wurz et al. |
| D495,755 | S | 9/2004 | Wurz et al. |
| D498,267 | S | 11/2004 | Crouch |
| 6,834,979 | B1 | 12/2004 | Cleaver et al. |
| 6,860,814 | B2 | 3/2005 | Cole |
| 6,899,626 | B1 | 5/2005 | Luciano et al. |
| D508,268 | S | 8/2005 | Hanchar et al. |

(Continued)

OTHER PUBLICATIONS

Bluebird Slant Widescreen literature from www.wms.com/technologyandinnovation__cabinets__widescreen.php dated May 19, 2009, showing a gaming machine cabinet that was sold and/or publicly disclosed at least as early as Dec. 13, 2008.

(Continued)

*Primary Examiner* — Tramar Harper
(74) *Attorney, Agent, or Firm* — Dickinson Wright PLLC

(57) ABSTRACT

A gaming machine includes curved panel edges that may be illuminated. The panel edges have compound curves. A tool and method for forming compound curved edge shapes is also disclosed.

14 Claims, 6 Drawing Sheets

U.S. PATENT DOCUMENTS

| | | | |
|---|---|---|---|
| D508,961 | S | 8/2005 | Gatto et al. |
| D513,044 | S | 12/2005 | Morrison |
| 7,014,563 | B2 | 3/2006 | Stephan et al. |
| D525,664 | S | 7/2006 | Cole |
| D535,338 | S | 1/2007 | Linard et al. |
| 7,213,941 | B2 | 5/2007 | Sloan et al. |
| 7,237,925 | B2 | 7/2007 | Mayer et al. |
| 7,284,876 | B2 | 10/2007 | Ericson |
| D563,481 | S | 3/2008 | Looks et al. |
| D564,601 | S | 3/2008 | Strahinic et al. |
| 7,339,782 | B1 | 3/2008 | Landes et al. |
| D566,197 | S | 4/2008 | Greenberg et al. |
| 7,364,505 | B2 | 4/2008 | Mattice et al. |
| 7,367,685 | B2 | 5/2008 | Moll |
| D573,200 | S | 7/2008 | Hashimoto et al. |
| 7,476,154 | B2 | 1/2009 | Kogo et al. |
| D586,866 | S | 2/2009 | Hsu |
| 7,506,463 | B2 | 3/2009 | Holst |
| 7,506,997 | B1 | 3/2009 | Eriksson |
| 7,513,830 | B2 | 4/2009 | Hajder et al. |
| D592,709 | S | 5/2009 | McComb et al. |
| D619,660 | S | 7/2010 | Cole et al. |
| D626,183 | S | 10/2010 | Cole et al. |
| D633,950 | S | 3/2011 | Terpstra et al. |
| D649,605 | S | 11/2011 | Terpstra et al. |
| 2004/0001335 | A1 | 1/2004 | Wu |
| 2004/0053699 | A1 | 3/2004 | Rasmussen et al. |
| 2004/0224776 | A1 | 11/2004 | Nagano |
| 2006/0030412 | A1 | 2/2006 | Cole |
| 2006/0073900 | A1 | 4/2006 | Cole |
| 2006/0094511 | A1* | 5/2006 | Roireau .......................... 463/46 |
| 2007/0035965 | A1 | 2/2007 | Holst |
| 2007/0149291 | A1 | 6/2007 | Mitchell |
| 2007/0159820 | A1 | 7/2007 | Crandell et al. |
| 2007/0171640 | A1 | 7/2007 | Sloan et al. |
| 2007/0197301 | A1 | 8/2007 | Cole |
| 2007/0225079 | A1 | 9/2007 | Cole |
| 2007/0287527 | A1 | 12/2007 | Tanabe et al. |
| 2007/0287528 | A1* | 12/2007 | Hirato et al. .................... 463/20 |
| 2007/0287544 | A1 | 12/2007 | Hirato et al. |
| 2008/0113794 | A1 | 5/2008 | Cole |
| 2008/0119288 | A1* | 5/2008 | Rasmussen ..................... 463/46 |
| 2008/0194313 | A1 | 8/2008 | Walker |
| 2008/0227522 | A1 | 9/2008 | Toyoda |
| 2008/0248852 | A1 | 10/2008 | Rasmussen |
| 2008/0268949 | A1* | 10/2008 | Dell ............................... 463/31 |
| 2009/0011839 | A1 | 1/2009 | Cole |
| 2009/0045723 | A1 | 2/2009 | Ishikawa |
| 2009/0179597 | A1* | 7/2009 | Salmon ......................... 315/313 |
| 2009/0247261 | A1 | 10/2009 | Koami |
| 2009/0275389 | A1 | 11/2009 | Englman et al. |
| 2010/0016084 | A1 | 1/2010 | Bleich et al. |

OTHER PUBLICATIONS

Spec International, Inc., GEN-311 gaming machine ca binet, publicly disclosed at least as early as Dec. 13, 2008.

* cited by examiner

GAMING MACHINE CABINET WITH EDGE LIGHTING

BACKGROUND OF THE INVENTION

Various types of gaming machines have been developed. Gaming machines may have a wide variety of configurations, including relatively small units that may be positioned on a counter or other support surface. Other known types of units include sit-down units, configured to be used by a seated user, and standup units, configured to be used by a standing user. Also, gaming machines may be wager-based units that are typically utilized in casinos or other such environments. Alternately, gaming machines may be solely for amusement purposes, whereby play of the game does not include placing a wager or bet.

Gaming machines may include a variety of lights, sounds, or other such features that are configured to catch the attention of potential users and/or contribute to the environment and experience of users.

SUMMARY OF THE INVENTION

One aspect of the present invention is a gaming machine including a cabinet having generally upright opposite side panels, a rearwardly facing rear side and a forwardly facing front side. At least one of the opposite side panels includes a forward portion having horizontally spaced-apart inner and outer sheets. The inner and outer sheets each include curved edge portions that extend toward one another. The curved edge portions have edges that are spaced-apart from one another to form an elongated gap therebetween, and inner and outer surfaces adjacent the edges. The gaming machine includes at least one visual display disposed on the front side of the cabinet for viewing by a user. The gaming machine also includes at least one player interaction device that allows a player to provide game input.

The gaming machine further includes an elongated light-transmitting member extending along a length of the elongated gap and spanning the gap. The elongated light-transmitting member defines front and rear surfaces, and first and second pairs of spaced-apart retaining surfaces disposed adjacent the inner and outer surfaces of the inner and outer sheets to thereby retain the elongated light-transmitting member. The gaming machine further includes a plurality of light sources along the rear surface of the elongated light-transmitting member whereby light from the light sources illuminates the front surface of the elongated light-transmitting member. The gaming machine may comprise a standup type gaming machine or it may comprise a sit-down unit. The gaming machine may also comprise a relatively compact unit that is configured to be supported on a counter or other support surface. Furthermore, the gaming machine may comprise a wager-based gaming machine or it may comprise a gaming machine that does not include wager inputs or other such features. The inner and outer sheets may be formed from sheet metal or other suitable material, and the elongated light-transmitting member may be made of a polymer material or other suitable material.

Another aspect of the present invention is a gaming machine cabinet that includes a pair of generally upright opposite side panels, each defining a front edge. The gaming machine cabinet also defines front and rear sides, and the side panels comprise spaced-apart inner and outer sheet members having portions extending along the front edges. The sheet members may comprise metal or other suitable material. The gaming machine cabinet further includes at least one game display disposed on the front side of the cabinet for viewing by a user, and at least one player interaction device that allows a player to provide inputs. The gaming machine cabinet further includes elongated light-transmitting members extending along at least a portion of the front edges of the side panels. The elongated light-transmitting members include oppositely-opening elongated grooves, and front and rear surfaces. At least one light source is disposed adjacent the rear surface of each elongated light-transmitting member to thereby illuminate at least a portion of the front surface of each light-transmitting member. The gaming machine cabinet further includes a plurality of clamp members engaging the elongated grooves and connecting the light-transmitting members to the inner members of the side panels, such that the light-transmitting members can be attached to the inner sheet members, followed by connection of the outer sheet members to the inner sheet members.

Yet another aspect of the present invention is a method of forming a panel. The method includes providing a generally planar metal sheet having a peripheral edge. A curved edge is formed along at least a portion of the peripheral edge such that the metal sheet is initially substantially planar along the curved edge. The curved edge may be formed by cutting or other suitable techniques. The method further includes providing a forming tool having first and second forming wheels. The first and second forming wheels have generally circular outer edge surfaces, and the outer edge surface of the first forming wheel has a concave cross-sectional shape, and the outer edge surface of the second forming wheel has a convex cross-sectional shape. The method further includes positioning the forming tool in a CNC (Computer Numerical Controlled) machine of the type having a table that is movable in a plane. The metal sheet is positioned on the table, and the curved edge is positioned between the first and second forming wheels. The table is moved in the plane, while the forming tool is simultaneously rotated about an axis that is normal to the plane to thereby deform an edge portion of the metal sheet in a direction that is transverse to the plane. A compound curve is thereby formed along the curved edge of the metal sheet. A pair of components having compound curved edges can be positioned adjacent one another to form an elongated gap between the curved edges. Furthermore, an elongated member having oppositely-opening elongated grooves may be positioned in the gap, with the edges of the components positioned in the elongated groove to thereby retain the elongated member. The elongated member may comprise a light-transmitting polymer material that is at least partially illuminated by one or more light sources.

DETAILED DESCRIPTION OF PREFERRED EMBODIMENT

Figure 1:
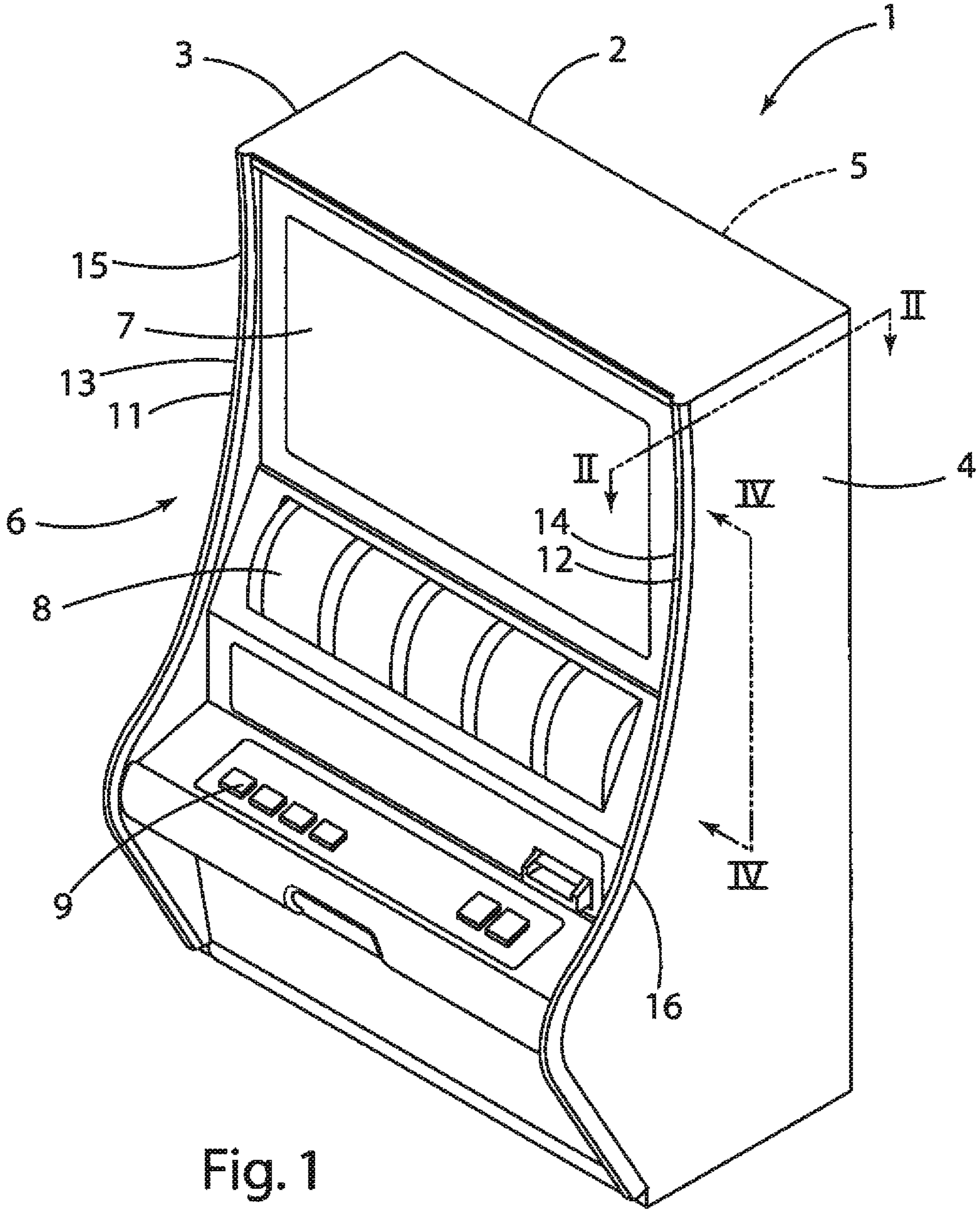
FIG. 1 is an isometric view of a gaming machine according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a gaming machine 1 according to one aspect of the present invention includes a cabinet 2 having generally upright opposite side panels 3 and 4, a rearwardly-facing rear side 5, and a forwardly-facing front side 6. At least one game display, such as a video screen 7 or reels 8, is disposed on the front side 6 of the cabinet 2 for viewing by a user. The reels 8 may comprise mechanical reels or they may comprise one or more electronic displays that are configured to have an appearance that is similar to a mechanical reel. It will be understood that the gaming machine 1 may include one or more displays of various types, depending upon the requirements of a particular application, and it need not include reels 8 or an electronic display configured to have a reel-like appearance. The gaming machine 1 also includes one or more player interaction devices such as buttons 9, touch screen displays, or other suitable input/control features.

The opposite side panels 3 and 4 include forward portions 11 and 12, respectively. As discussed in more detail below, one or more elongated members 13, 14 may be positioned along the forward portions 11, 12, respectively. The elongated members 13, 14 may comprise light-transmitting polymer material that is illuminated by one or more light sources to thereby form illuminated forward edges 15 and 16 of side panels 3 and 4, respectively.

Figure 2:
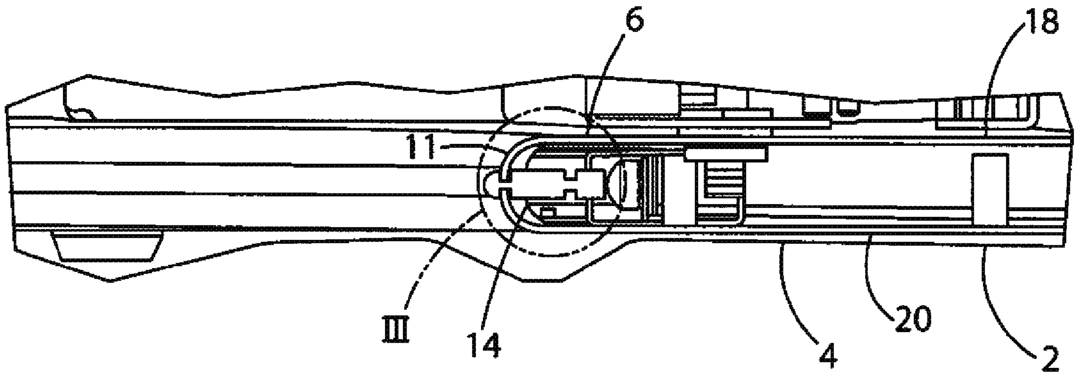
FIG. 2 is a partially fragmentary cross-sectional view of the gaming machine of FIG. 1, taken along line II-II of FIG. 1.
Figure 3:
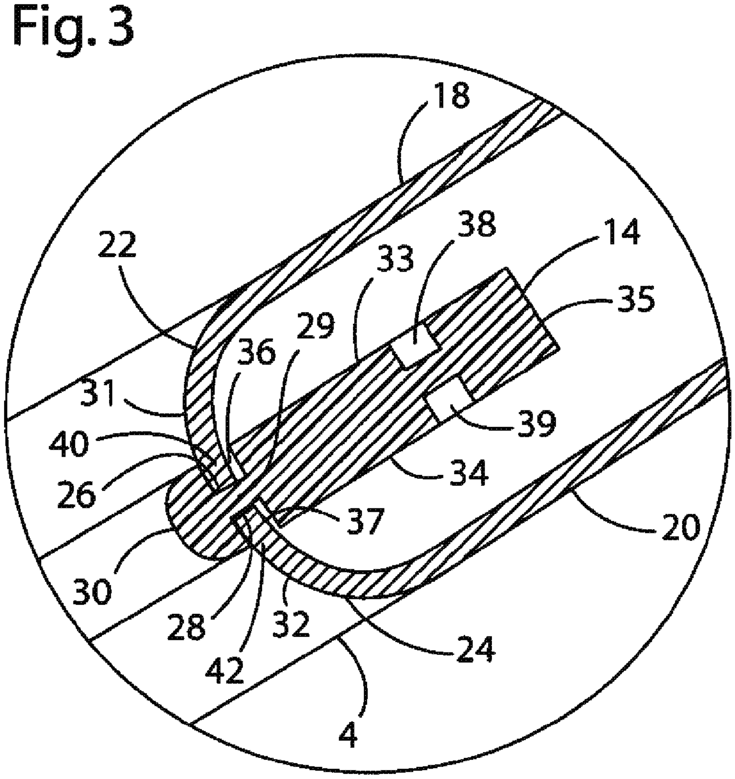
FIG. 3 is an enlarged view of a portion of the gaming machine of FIG. 2.

With further reference to FIGS. 2 and 3, the opposite side panels 3 and 4 may include inner and outer members, such as sheet metal inner and outer members 18 and 20 of side panel 4. In the illustrated example, the side panels 3 and 4 have substantially the same construction, and side panels 3 and 4 are mirror images of one another. Accordingly, the side panel 3 will not be described in detail.

Referring again to FIG. 3, the inner and outer members or skins 18 and 20 may be made from a sheet metal such as steel or other suitable material. The inner and outer members 18 and 20 include forward portions 22 and 24, respectively, that are curved inwardly toward one another and terminate at edges 26 and 28, respectively. The edges 26 and 28 are spaced-apart from one another to form an elongated gap 29. In the illustrated example, the elongated gap 29 extends along substantially the entire forward edge 16 (see also FIG. 1) of side panel 4. However, the elongated gap 29 could be significantly shorter or it could comprise a plurality of gaps arranged along the forward edges in a segmented manner. As shown in FIG. 3, the elongated light-transmitting member 14 has a generally rectangular cross-sectional shape, with a smoothly curved or rounded forward surface 30 that projects forwardly from forward surfaces 31 and 32 of sheet metal members 18 and 20. The elongated light-transmitting member 14 also includes oppositely-facing outer side faces or surfaces 33 and 34 and a rear surface 35. In the illustrated example, the surfaces 33 and 34 are substantially planar, and the rear surface 35 is smoothly curved and corresponds to the curve of the forward edges 15 and 16 (see also FIG. 1) of the side panels 3 and 4. Similarly, the rounded forward surface 30 is also curved about a generally horizontal axis and corresponds to the curved forward edges 15 and 16. This curvature is in addition to the relatively small curvature of the surface 30 due to its radius about an axis that is normal to the cross-sectional plane of FIG. 3.

A first pair of oppositely-opening grooves 36 and 37 are formed in the opposite side surfaces 33 and 34, respectively, of light-transmitting member 14. The grooves 36 and 37 receive end portions 40 and 42 of sheet metal members 18 and 20, respectively. As described in more detail below, the grooves 38 and 39 may be utilized to secure the elongated light-transmitting member 14 to the inner sheet metal member 18 and/or the outer sheet metal member 20. The configuration of the rounded forward surface 30 of elongated light-transmitting member 14 and the curved forward portions 22 and 24 of sheet metal members 18 and 20, respectively, along with the grooves 36 and 37, provides a smooth, uncluttered exterior appearance for the forward portions 11 and 12 (see also FIG. 1) of side panels 3 and 4, respectively.

Figure 4:
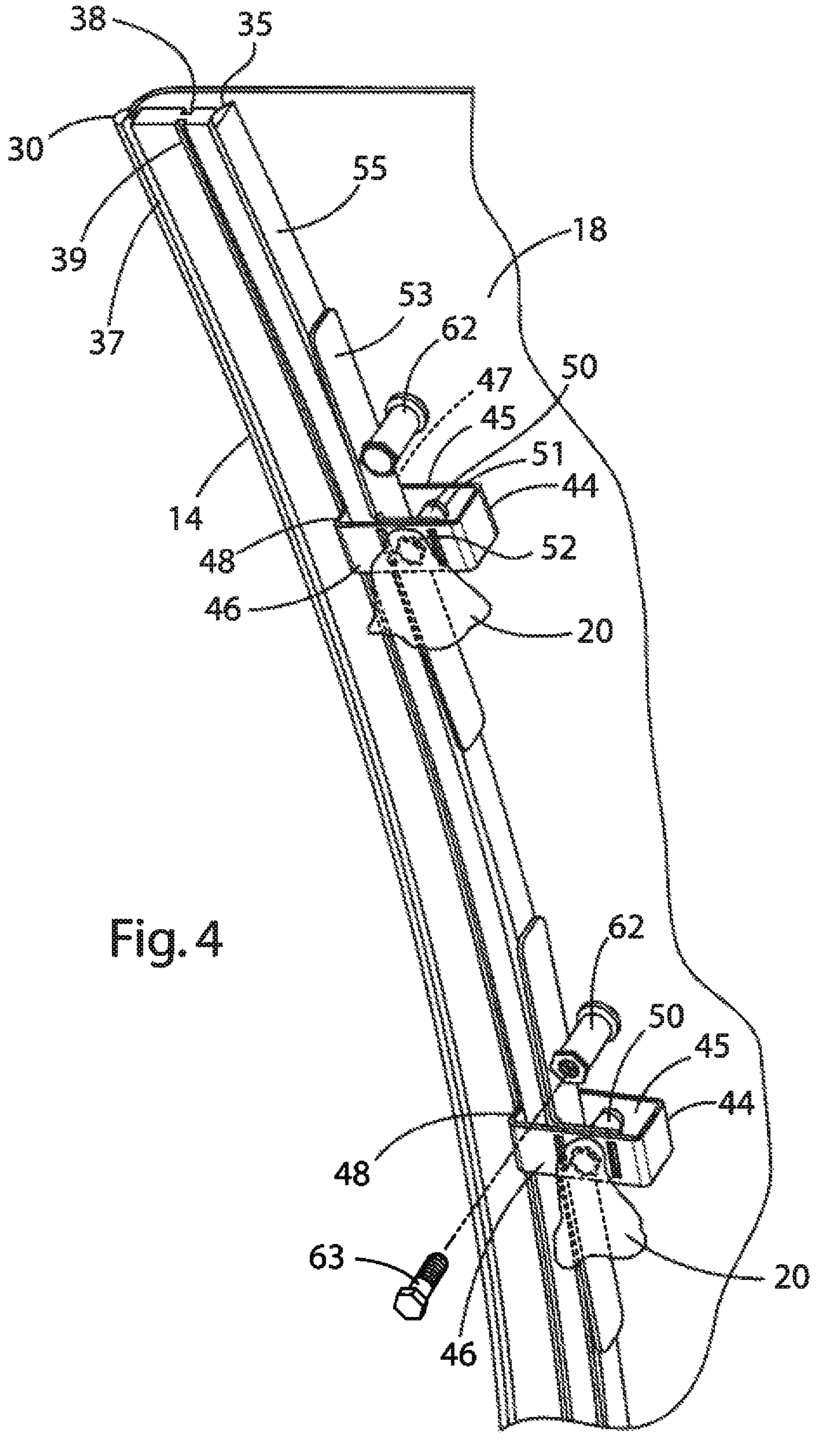
FIG. 4 is a partially fragmentary isometric view of a portion of the gaming machine of FIG. 1, taken along line IV-IV of FIG. 1, wherein only a portion of the outer sheet metal skin of the side panel is not shown.
Figure 5:
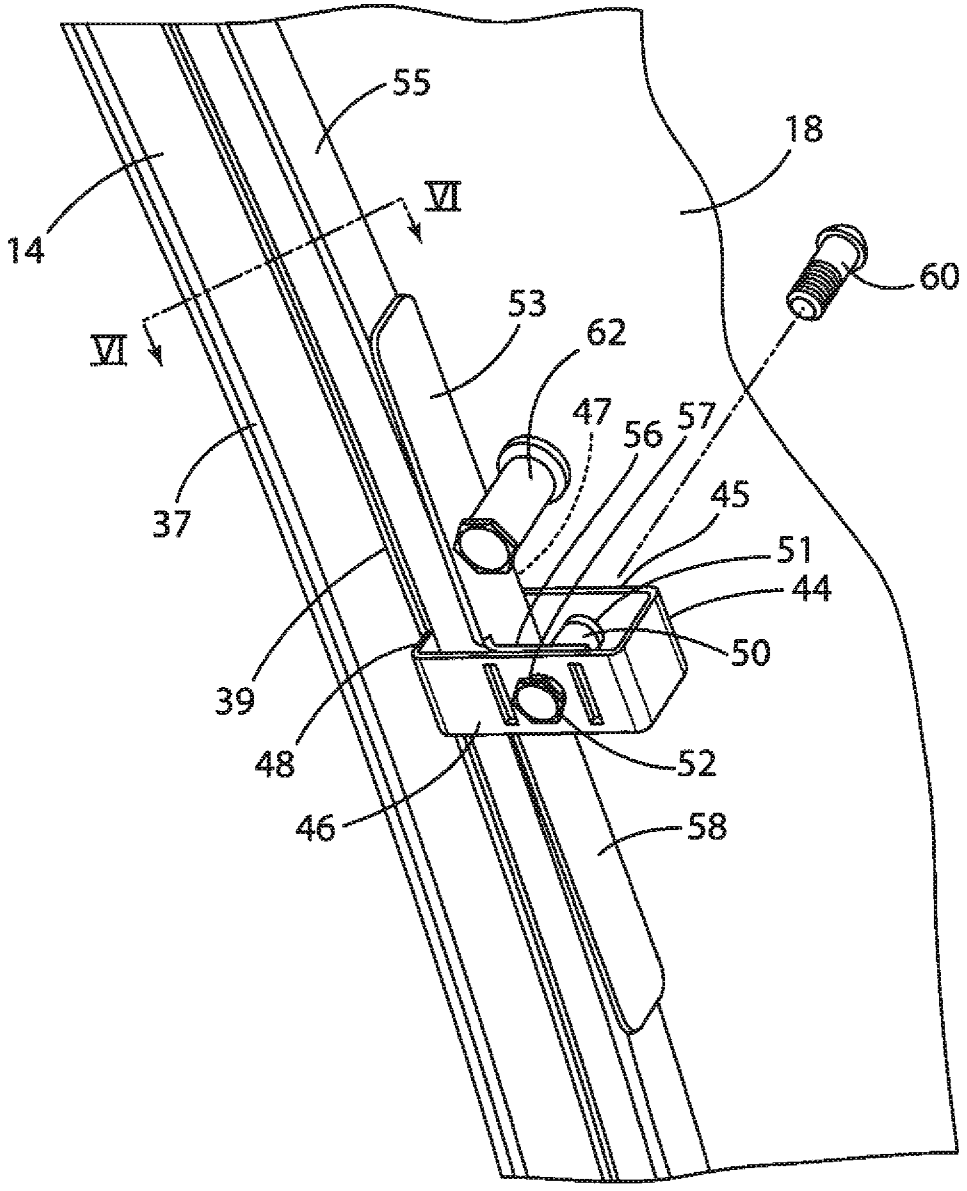
FIG. 5 is an enlarged view of a portion of the gaming machine of FIG. 4.

With further reference to FIGS. 4 and 5, a plurality of clamps/retainers 44 connect the elongated light-transmitting member 14 to the sheet metal members 18 and 20. Each clamp/retainer 44 includes a pair of extensions or arms 45 and 46 having transverse end portions 47 and 48, respectively, that are received in grooves 38 and 39, respectively, of elongated light-transmitting member 14. The transverse end portions 47 and 48 of extensions or arms 45 and 46 may be mirror images of one another or they may have other configurations. Also, the grooves 38 and 39 of the elongated light-transmitting member 14 may have shapes and configurations other than the configuration shown in the illustrated example.

A boss or standoff 50 is secured to the outer sheet metal member 20 and extends inwardly therefrom through clearance openings 51 and 52 in extensions 45 and 46, respectively. Standoff/boss 50 preferably comprises a commercially available internally threaded unit that is secured by crimping/deforming preformed portions of standoff/boss 50 in a press or other suitable machine in a known manner. As discussed in more detail below, a screw or bolt 60 threadably engages standoff/boss 50 causing clamp arms 45 and 46 to clamp onto light-transmitting member 14. A retainer strip 53 made of metal, polymer, or other suitable material may be utilized to secure an elongated flexible LED "ribbon" strip 55 along the rear surface 35 of elongated light-transmitting member 14. The flexible LED ribbon strip 55 may comprise a commercially available illuminated strip having plurality of individual LED lights (not shown) positioned along the flexible LED ribbon strip 55. Light from the flexible LED ribbon strip 55 is transmitted into elongated light-transmitting member 14 through rear surface 35 of elongated light-transmitting member 14, and the light then exits through the rounded forward surface 30 of elongated light-transmitting member 14 to provide the lighted forward edges 15 and 16 (see also FIG. 1). In a preferred embodiment, the opposite side surfaces 33 and 34 reflect at least a substantial portion of light from flexible LED ribbon strip 55 back into the elongated light-transmitting member 14, such that the light does not escape until it reaches the rounded forward surface 30. Similarly, the surfaces of the elongated light-transmitting member 14 formed by grooves 36-39 may also reflect all or most of the light internally. In a preferred embodiment, the entire elongated light-transmitting member 14 is light-transmitting and substantially all of forward surface 30 is illuminated. However, light-transmitting member 14 could be constructed such that only a portion or portions of light-transmitting member 14 transmit light therethrough such that only a portion or portions of front surface 30 are illuminated. For example, portions of light-transmitting member 14 could be made of a clear or translucent material, and other portions thereof could be made of an opaque material that does not transmit light. Similarly, a layer paint or other opaque material could be disposed on surface 30 to provide selective illumination of a portion or portions of surface 30. Also, LED ribbon strip 55 (or other light source) could be configured to provide light along only a selected portion of light-transmitting member 14 such that only a portion or portions of surface 30 are illuminated. Still further, the elongated member 14 could comprise a non-light-transmitting material. In this case, an LED ribbon strip 55 is not utilized, and the forward surface 30 of elongated member 14 is not illuminated.

In a preferred embodiment, elongated member 14 comprises a one-piece polymer member. Elongate member 14 may comprise urethane, polyurethane, acrylic, or other suitable polymers or other materials having sufficient strength, flexibility, and/or light-transmitting properties (if elongated member 14 is to be illuminated). In general, elongated member 14 comprises a rigid or semi-rigid material that is not excessively brittle to permit some flexing of elongated member 14 to accommodate differences in shape and the like of the various components due to production tolerances and the like.

Referring again to FIG. 5, retainer 53 includes a flat tab 56 that extends inwardly along extension 46 of clamp 44. Boss 50 extends through a clearance opening 57 in tab 56 to thereby interconnect the retainer 53 with clamp 44. Retainer strip 53 includes an elongated main portion 58 that extends along the flexible LED ribbon strip 55. The elongated main portion 58 may be curved to correspond to the radius of curvature of the flexible ribbon strip 55, or it may be substantially flat.

During assembly, clamps 44 and retainers 53 are first utilized to secure the elongated light-transmitting member 14 to the outer skin 20. The outer skin 20 is then connected to the inner sheet metal member 18, typically after the inner sheet member 18 has been assembled to the main structure of the cabinet 2. As discussed above, the standoffs/bosses 50 are secured to the outer sheet metal member 20 and extend inwardly therefrom. During assembly, the clamps 44 are positioned on the elongated light-transmitting member 14 with transverse end portions 47 and 48 of extensions 45 and 46, respectively, positioned in elongated grooves 38 and 39 of elongated light-transmitting member 14. The clamps 44 and retainers 53 are then slid onto the standoffs/bosses 50 on outer sheet metal member 20, A screw 60 threadably engages the standoffs/bosses 50 to thereby clamp the extensions of clamp 45 toward one another. This causes the elongated light-transmitting member 14 and flexible LED ribbon strip 55 to be secured to the outer sheet metal member 20. In the illustrated example, the standoffs/bosses 50 include an internally-threaded opening that threadably receives screw 60. However, the standoffs/bosses 50 could include external threads, and threaded fastener 60 could comprise a nut or other internally-threaded connector.

Figure 6:
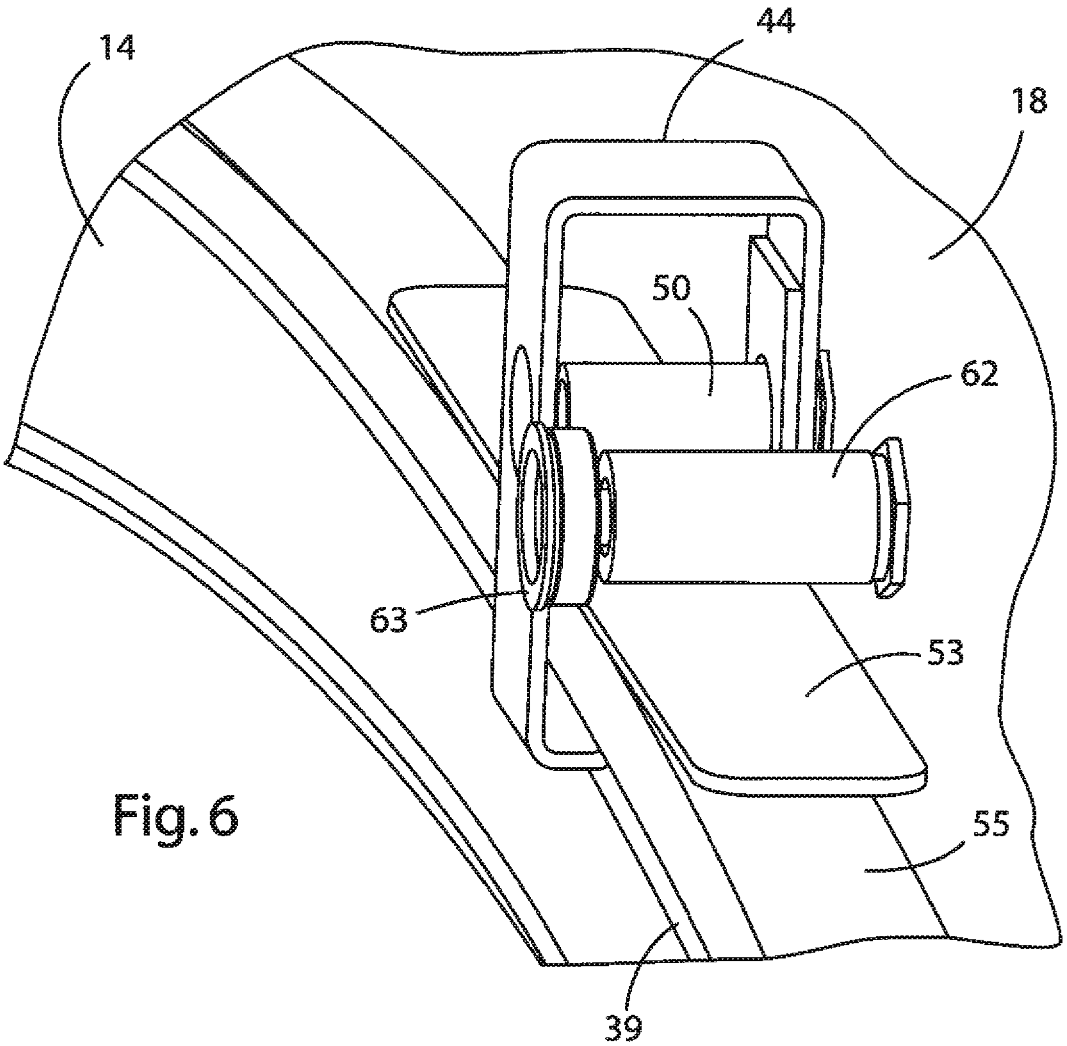
FIG. 6 is an isometric view of the gaming machine cabinet of FIG. 5, taken along line VI-VI of FIG. 5.

A plurality of additional standoffs/bosses 62 are secured to the inner sheet metal member 18 and extend outwardly therefrom. During assembly, after the elongated light-transmitting member 14 and flexible LED ribbon strip 55 are secured to the outer sheet metal member 20, the outer sheet metal member 20 is positioned adjacent inner sheet metal member 18, and screws 63 (see also FIG. 6) or other suitable fasteners are then inserted through clearance openings (not shown) in outer sheet metal member 20 to threadably engage standoffs/bosses 62. The outer sheet metal member 20 is thereby secured to the inner sheet metal member 18 at a preselected distance therefrom. It will be understood that standoffs/bosses 62 could have external threads, and threaded fasteners 63 could comprise internally-threaded nuts. Also, the standoffs/bosses 62 could be secured to the outer skins 20 and extending inwardly therefrom, with threaded fasteners being received through clearance openings (not shown) in inner sheet metal member 18.

Figure 7:
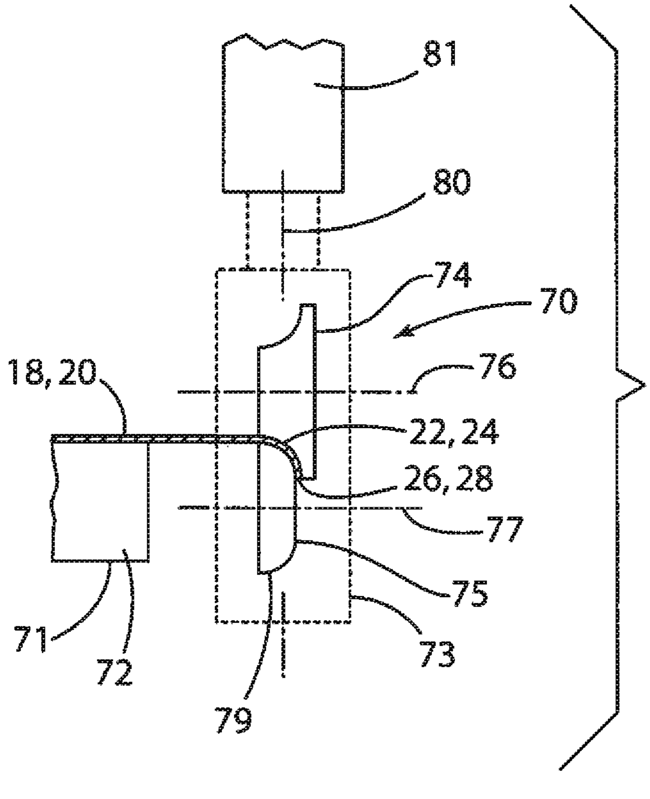
FIG. 7 is a partially schematic, fragmentary view of a tool/process for forming a curved panel edge.

With further reference to FIG. 7, the curved forward portions 22 and 24 of the sheet metal inner and outer members 18 and 20, respectively, may be formed by a tool 70 that is positioned in a CNC machine 71 having a table 72 that can be shifted in a horizontal plane. The tool 70 includes a head 73 having first and second forming wheels 74 and 75 that are configured to rotate about a first axis 76 and a second axis 77, respectively. The first forming wheel 74 includes an annular outer surface 78 having a concave curved shape in cross section, and second forming wheel 75 has an annular outer surface 79 having a convex curved shape in cross section. Surfaces 78 and 79 have radiuses that are about equal to one another in cross section. The forming wheels 74 and 75 are preferably made of tool steel or other wear resistant material.

During fabrication of the inner and outer skins 18 and 20, a generally flat piece of sheet metal or other suitable material is first cut to form a curved edge having a contour that generally corresponds to the desired final edge shape of the forward edges 15 and 16 (see also FIG. 1) of side panels 3 and 4. The initial cutting may be performed using a saw, laser, water jet, or other suitable process. At this point, the sheet metal member is still substantially flat. The piece of sheet metal that will be utilized to fabricate sheet metal member 18 or 20 is then secured to table 72 of CNC machine 71, and the edge 26 or 28 is positioned between the forming wheels 74 and 75 of tool 70. The table 72 of CNC machine 71 is then shifted in a horizontal plane to move the sheet metal member such that the forming wheels 74 and 76 travel along the edge 26 (or 28) of the sheet metal. An upper structure 81 of CNC machine 71 is simultaneously rotated about a vertical axis 80, such that the axes of rotation 76 and 77 of forming wheels 74 and 75 are positioned substantially normal to the curved edges 26 and 28 as the forming wheels 74 and 75 move along the edge 26 (or 28). In this way, the tool 70 and CNC machine 71 can be utilized to form compound curves along the edges of sheet metal parts. Significantly, the tool 70 and CNC machine 71 can be readily configured to provide different curved edge shapes as required for a particular application. For example, various gaming machine cabinets having somewhat different edge configurations may be fabricated utilizing the same tool 70 and CNC machine 71 cutting the desired curved edge in the sheet metal and by programming the CNC machine to follow the curved edge. This provides substantial flexibility compared to utilizing sheet metal forming dies that are configured to form panels having a single predetermined configuration. It will be understood that the CNC machine 71 of FIG. 7 may be a commercially available, prior art CNC machine.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A gaming machine, comprising: a cabinet having generally upright opposite side panels, a rearwardly facing rear side, and a forwardly facing front side; and wherein at least one of the opposite side panels includes a forward position having horizontally spaced-apart inner and outer sheets, the inner and outer sheets including curved edge portions that extend toward one another, the curved edge portion having edges that are spaced-apart from one another to form an elongated gap therebetween and inner and outer surfaces adjacent the edges; at least one game display disposed on the front side of the cabinet for viewing by a user; at least one player interaction device that allows a player to provide game input; an elongated light-transmitting member extending along a length of the elongated gap and spanning the gap, the elongated light-transmitting member defining front and rear surfaces and first and second pairs of spaced-apart retaining surfaces disposed adjacent the inner and outer surfaces of the inner and outer sheets to thereby retain the elongated light-transmitting member, wherein at least a portion of the light-transmitting member is configured to transmit light from a portion of the rear surface to a portion of the front surface; and a plurality of light sources disposed along the rear surface of the elongated light-transmitting member, whereby light from the light sources illuminates at least a portion of the front surface of the elongated light-transmitting member.

2. The gaming machine of claim 1, wherein: the elongated light-transmitting member has a substantially uniform cross-sectional shape and defines a center line extending along a length of the elongated light-transmitting member, and wherein at least a portion of the center line is curved.

3. The gaming machine of claim 2, wherein: the elongated light-transmitting member forms a forward edge of the one side panel, and wherein the one side panel has a concave curved portion in a side elevational view of the cabinet.

4. The gaming machine of claim 3, wherein: at least a portion of the front surface of the elongated light-transmitting member has a convex curved shape in a cross section taken transverse to the center line.

5. The gaming machine of claim 1, wherein: the outer sheet comprises an outer surface of the one side panel, and wherein the inner and outer sheets include enlarged planar portions.

6. The gaming machine of claim 5, including: a plurality of spacers extending between and interconnecting the planar portions of the inner and outer sheets and fixing the spacing between the planar portions.

7. The gaming machine of claim 6, wherein: the spacers comprise threaded bosses; and including: a plurality of threaded fasteners engaging the threaded bosses and interconnecting the inner and outer skins.

8. The gaming machine of claim 1, wherein: substantially the entire front surface of the light-transmitting member illuminated by the light sources.

9. The gaming machine of claim 1, where the elongated light-transmitting member includes a pair of elongated grooves that open in opposite directions, and wherein at least portions of the edges of the inner and outer sheets are disposed in the grooves.

10. The gaming machine of claim 9, wherein: the elongated grooves include spaced-apart inner side walls forming the first and second pairs of retaining surfaces.

11. The gaming machine of claim 10, wherein: the elongated grooves comprise a first pair of elongated grooves disposed adjacent the front surface of the elongated light-transmitting member; the elongated light-transmitting member includes a second pair of elongated grooves that are spaced inwardly from the first pair of elongated grooves; and including: at least one retaining member engaging a selected one of the second pair of grooves and interconnecting the elongated light-transmitting member to at least a selected one of the inner and outer sheets.

12. The gaming machine of claim 11, wherein: the one retaining member comprises a pair of extensions received in the second pair of grooves.

13. The gaming machine of claim 12, wherein: a threaded fastener operably engaging the extensions and clamping the extensions into the second pair of grooves.

14. The gaming machine of claim 13, wherein: the threaded fastener engages the inner sheet and connects the elongated flexible member to the inner sheet.

* * * * *